March 25, 1969   H. H. WIEDER   3,435,323
MAGNETORESISTIVE MODULATOR
Filed Aug. 29, 1967   Sheet 2 of 3
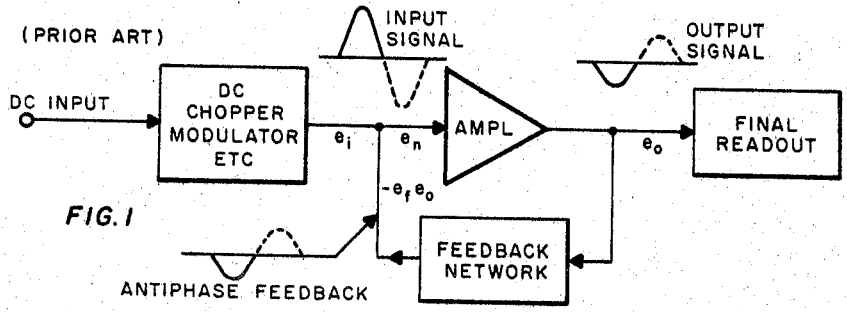
FIG. 1 (PRIOR ART)
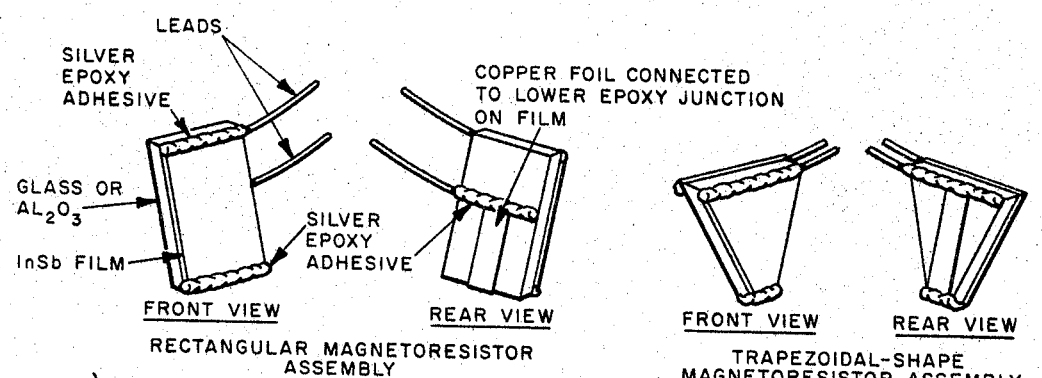
FIG. 7a — RECTANGULAR MAGNETORESISTOR ASSEMBLY
FIG. 7b — TRAPEZOIDAL-SHAPE MAGNETORESISTOR ASSEMBLY
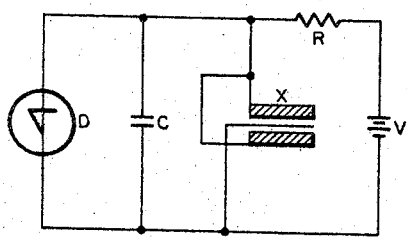
FIG. 14
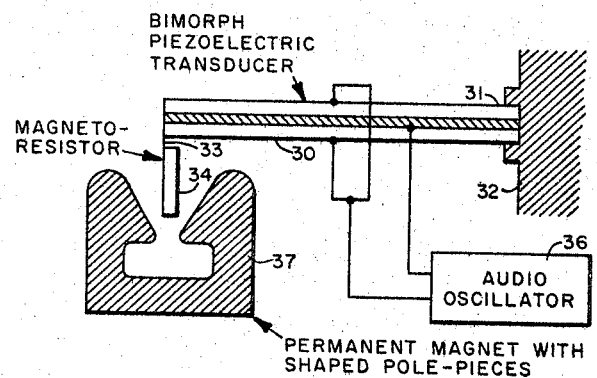
FIG. 8
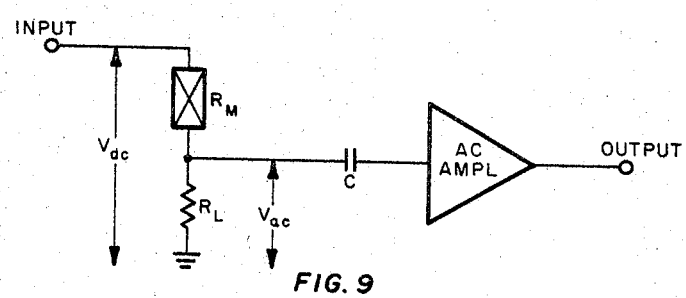
FIG. 9
HARRY H. WIEDER
INVENTOR.
BY J. M. St. Amand
ATTORNEY

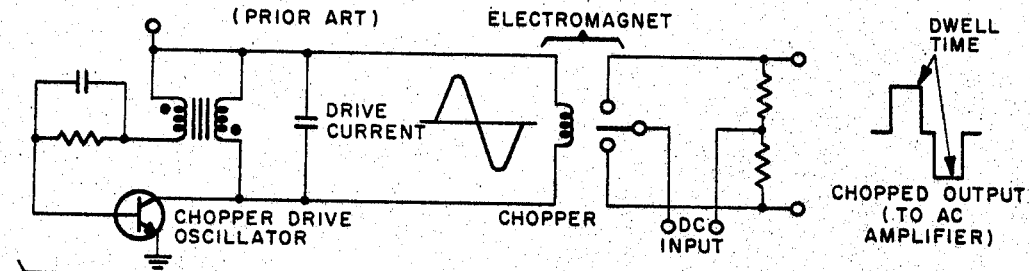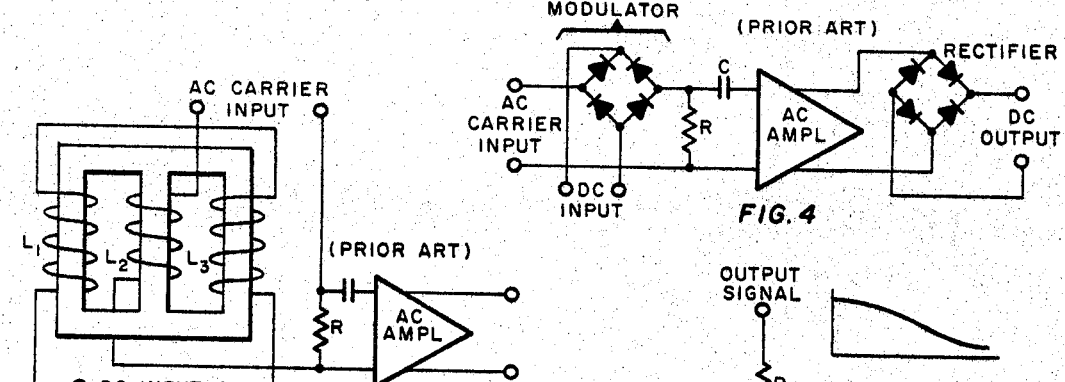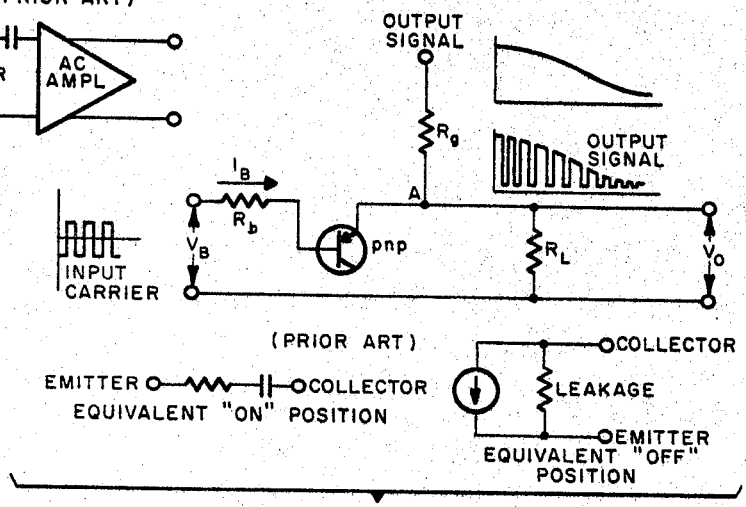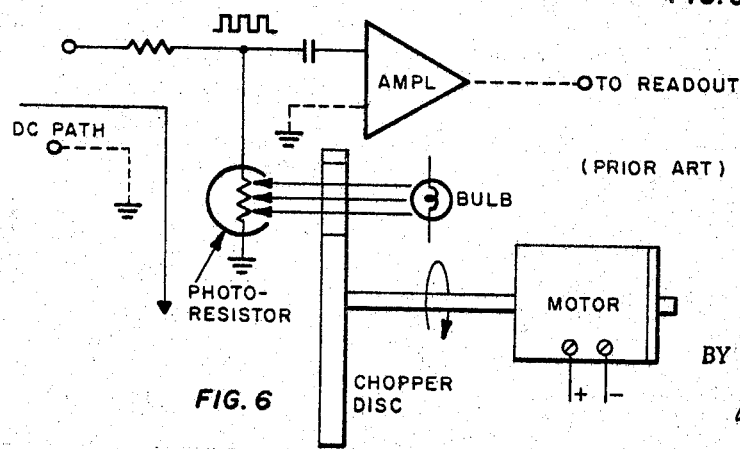
HARRY H. WIEDER
INVENTOR.
ATTORNEY

HARRY H. WIEDER
INVENTOR.

ATTORNEY

United States Patent Office 3,435,323
Patented Mar. 25, 1969

3,435,323
MAGNETORESISTIVE MODULATOR
Harry H. Wieder, Riverside, Calif., assignor to the United States of America as represented by the Secretary of the Navy
Filed Aug. 29, 1967, Ser. No. 664,222
Int. Cl. H02m 7/44
U.S. Cl. 321—44        10 Claims

ABSTRACT OF THE DISCLOSURE

A device for converting low-level DC signals into an essentially pure sine wave whose peak-to-peak amplitude is a linear function of the DC input signal by driving a thin film semiconductor magnetoresistive element in the gradient magnetic field of a permanent magnet; the magnetoresistor is mounted on a piezoelectric bimorph which is driven in its mechanical resonance mode.

Figure 10:
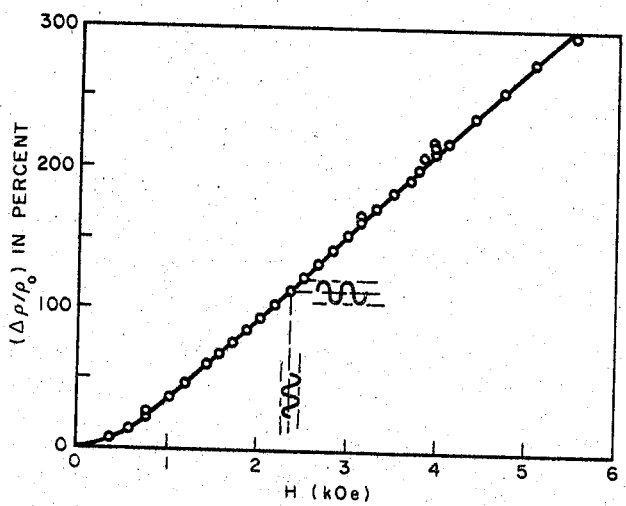

The invention herein described may be manufactured and used by or for the Government of the United States of America for governmental purposes without the payment of any royalties thereon or therefor.

BACKGROUND

Devices which convert a DC input into a proportional AC output have many applications in electronic instrumentation. A specific requirement for such a device exists in the processing of very low frequency analog data by means of DC amplifiers. In order to prevent the accumulated zero-base drift (which is an attendant feature of DC amplifiers) from affecting the amplified output signal and derating the accuracy of the measurement, a DC modulator or chopper is used (in conjunction with an AC amplifier and a rectifier) as shown in FIG. 1, to produce a zero-stable, low drift, DC amplifier.

Presently available prior art DC modulators are of the following types:

*Electromechanical modulators.*—An electromagnet actuated by an AC oscillator whose output frequency may have a value between 60 c.p.s. and 400 c.p.s. periodically reverses the DC signal input in accordance with FIG. 2. Disadvantages of this device are: a life expectancy limited to about 5000 hrs. (active); square wave output hence an AC amplifier with good high as well as low frequency response is required as a follow-up device. The increased bandwidth required for the amplifier also decreases the ultimate attainable signal to noise ratio. Null stability is limited by contact bounce, contact potentials and thermoelectric effects.

*Magnetic modulator.*—The basic principle is shown in FIG. 3. The magnetic flux set up in legs $L_1$ and $L_3$ by a DC input signal buck each other in the center leg $L_2$ acted upon by the AC carrier signals. The applied DC input signal causes an increase in the magnetic saturation of the core and hence, a change in the AC current seen by the follow up AC amplifier. Disadvantages of this device are: its weight and size, relatively slow response time (about 2 to 10 c.p.s.), and relatively high input and output impedances.

*Diode-bridge modulator.*—The basic principle is shown in FIG. 4. The AC carrier cycles the input DC on and off. The signal is developed across R and coupled to the amplifier via capacitor C. Each pair of diodes conducts on alternate half cycles of the AC excitation. The disadvantage of this circuit is the requirement for matched forward characteristics of the diodes; they must also have a very low (of the order of $10^{-8}$) reverse current.

*Transistor modulator.*—The principle is shown in FIG. 5. For a square-wave carrier input (pnp transistor) the emitter is periodically shorted to the collector during the period when transistor base is driven negative and is open circuited during positive portion of the input cycle. Devices of this type have a good frequency response and require low drive power, however, the leakage currents are bothersome and there is a residual "feedthrough" from the carrier input to the modulator output leading to a large residual error in the output signal as well as an impaired linearity.

*Photo-optical modulator.*—The principle, shown in FIG. 6, is based on the periodic interruption of a beam of light acting on a photoconductor thus causing a periodic change in its resistance. The disadvantage of this device is the high power required to turn the chopper motor and the stabilization required in order to reduce spurious modulation products.

All semiconductor devices described above employ one or more barrier pn junctions. They are, therefore, subject to transient as well as permanent damage from voltage transients, thermal spikes, nuclear flux or high density phonton injection.

This invention is significant as a replacement for electrochemical choppers presently used in a wide range of applications which require an extremely stable DC amplifier with low drift, high zero-base stability, as well as a virtually unlimited life expectancy. The latter condition is not fulfilled by electromechanical choppers. A typical example of use for the present modulator in a DC amplifier is in replacing the electromechanical chopper in a seismometer DC amplifier. Other applications are in DC synchronous amplifiers which require long unattended operation, where linearity of response is significant and where low weight and low power consumption are of importance; physiological monitoring instruments, low-level transducers of slowly varying signals (e.g., temperature, pressure, velocity, etc.) requiring DC amplification; radiological monitoring instruments; etc.

Figure 11:
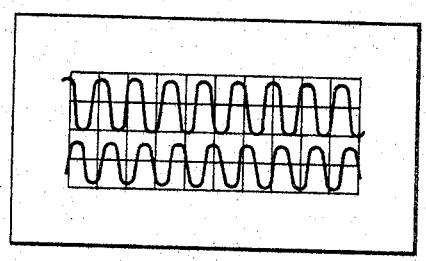
Figure 12:
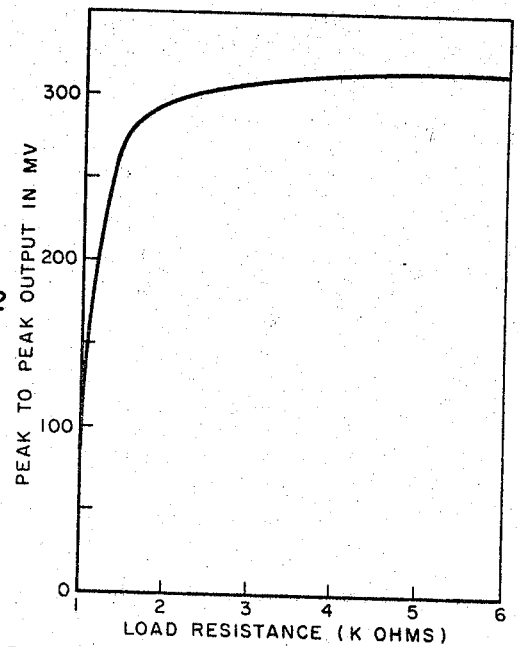
Figure 13:
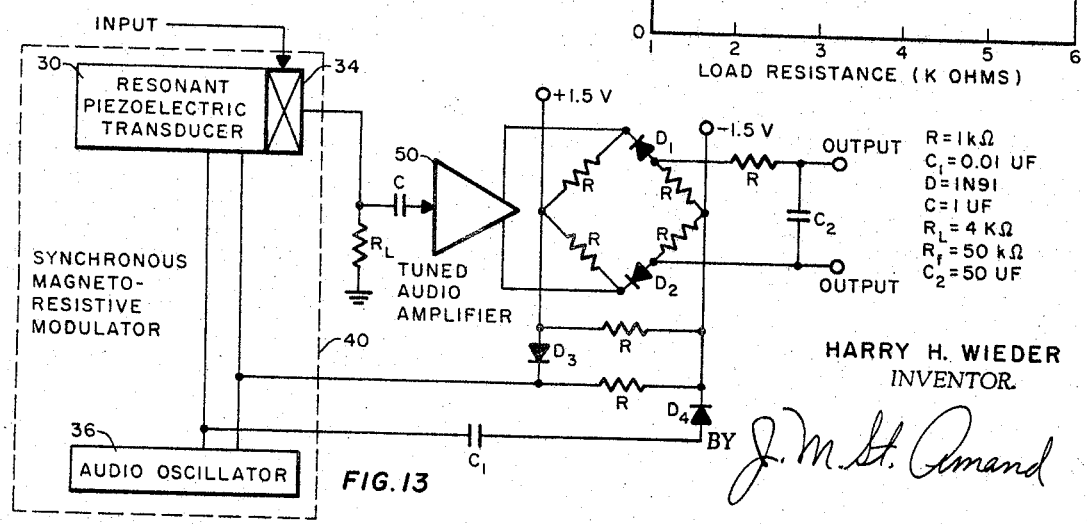

FIGS. 1–6 show examples of prior art.
FIG. 7 shows front and rear views of (a) a rectangular magnetoresistor assembly and (b) a trapezoidal-shape magnetoresistor assembly.
FIG. 8 is a schematic of a complete magnetoresistive modulator of the present invention.
FIG. 9 shows the magnetoresistor half-bridge circuit and the output, Vac, derived therefrom.
FIG. 10 shows the percent change in the fractional magnetoresistance.
FIG. 11 illustrates qualitatively the input and output waveform of the transducer driving oscillator.
FIG. 12 illustrates the dependence of the AC output voltage on load resistance.
FIG. 13 shows a magnetoresistive modulator for a DC amplifier.
FIG. 14 shows a simple circuit for driving a piezoelectric transducer.

The invention described herein is a simple device for converting a DC signal into an essentially pure sine wave whose peak- to-peak amplitude is a linear function of the DC input.

Magnetoresistance effect

The increase in the resistance of a conductor or semiconductor acted upon by a magnetic field transverse to the electric current flowing through it, is defined in terms of a magnetoresistance coefficient, $\Delta\rho/\rho_0$ where $\rho_0$ is the resistivity in zero magnetic field. The magnetoresistance coefficient is particularly large in semiconductors in which the electron mobility is large. The highest electron mobility measured in any material and hence the largest obtainable magnetoresistance coefficient is found in the intermetallic semiconductor, indium antimonide, (InSb).

In low magnetic fields (less than $10^3$ oersteds, $\Delta\rho/\rho_0$ is a quadratic function of the magnetic field H. In higher magnetic field it is essentially a linear function of H. In either case it is a function of the geometry of the specimen. A theoretical analysis of galvanomagnetic phenomena shows that an actual or an electrostatic short-circuit of the Hall voltage induced by a transverse magnetic field causes this "geometrical" contribution of $(\Delta\rho/\rho_0)$. Special shapes such as the coaxial Corbino disc are required for enhancing the effect in bulk InSb. Thin films of the two-phase system (InSb+In) can be grown in accordance with copending U.S. patent application Ser. No. 356,330 filed Mar. 31, 1964 for "Fabrication of Magnetoresistive Semiconductor Film Devices" and U.S. Patent No. 3,321,384 issued May 23, 1967 for "Semiconductor Film Hall Generators Processed on Oxide Metal Substrates" by H. H. Wieder and A. R. Clawson. The large $(\Delta\rho/\rho_0)$ is not dependent on the macroscopic geometry of a particular magnetoresistor. Instead it depends primarily on the microscopic effects of the embedded indium inclusions producing an electrostatic short-circuit of the InSb dendrites. This subject is discussed in "Transverse Hall Coefficient and Magnetoresistance of Two-Phase InSb-In Layers," H. H. Wieder and N. M. Davis, Solid-State Electronics, 8, 605–610 (1965) and "Crystallization and Properties of InSb Films Grown From a Non-Stoichiometric Liquid," H. H. Wieder, Solid State Communications, 3, 159–160 (1965). Magnetoresistors of arbitrary geometry may be fabricated from these films.

Other advantages associated with these films consist of: A high internal resistance: magnetoresistors have been fabricated thus far up to an $R_0=12000$ oms, hence the magnetoresistor can be matched to the input of conventional amplifiers while bulk InSb can be fabricated only in elements with $R_0 \leq 1$ ohm. Good heat dissipation: Magnetoresistors deposited on metal-oxide substrate while having a high thermal conductance dissipate heat better and are less subject to perturbation thermoelectric effects. High efficiency: Because of the reduced thickness of film magnetoresistors, they may be used in narrow-gap magnetic circuits thus increasing the overall efficiency of magnetoresistance based transducers and modulators as will be shown subsequently.

*Magnetoresistive modulator*

The salient features of a magnetoresistive modulator of the present invention are illustrated in FIGS. 7–9. A thin film of (InSb+In) fabricated in accordance with the considerations described above is shaped into a convenient magnetoresistor element such as shown in FIGS. 7(a) and (b). The choice of either configuration, rectangular, FIG. 7a or trapezoidal FIG. 7b, is dictated by two considerations: first, the need to maximize the change in resistance exhibited by the magnetoresistor in a particular magnetic field gradient, and second, the need to keep the change in resistance an essentially linear function of the mechanical displacement for a sinusoidal monochromatic output signal. The preferred embodiment of this invention uses a piezoelectric bimorph (self tuning at its own resonant frequency) to produce linear transducer action for driving a magnetoresistive element.

The schematic of a complete magnetoresisitive modulator is shown in FIG. 8. A piezoelectric transducer 30, such as the "bimorph" element manufactured by the Clevite Corporation, has one end 31 rigidly mounted in a support 32. The other end is attached at 33 to a magnetoresistor 34 such as shown in FIGS. 7a and b. It is constrained to move in one dimension only, in consonance with the electric field applied to it from an audio oscillator 36, for example. Piezoelectric transducer 30 is preferably driven at a frequency equal to its mechanical resonance. The bimorph piezoelectric transducer configuration consists of a bilaminar strip fused to an intermediate metallic vane. The polarization is perpendicular to the length of the lamina. While one element expands in consequence of the applied field, th other contracts thus enhancing the total one-dimensional flexure of the transducer. The pole-pieces of permanent magnet 37 are shaped in such a way that the magnetoresistor 34 driven by piezoelectric transducer 30 oscillates in a linear magnetic field gradient and its quiescent point is chosen in accordance with FIG. 10 which shows the percent change in the fractional magnetoresistance due to a sinusoidal exciting magnetic field biased in the linear region of the characteristic. The effective resistance $R_M$ of the magnetoresistor is then:

$$R_M = R_0 + (\Delta R/\Delta H) H \qquad (1)$$

and for the piezoelectric element driven in its resonant mode:

$$H = H_0 \sin wt \qquad (2)$$

In accordance with FIG. 9, the DC current drawn by the magnetoresistor in series with the load resistor is:

$$i_{dc} = \frac{v_{dc}}{R_0 + R_L} \qquad (3)$$

where $R_0$ is the effective resistance at the operating point, i.e., for $H=H_0$. We write: $i_{ac} = (\Delta R/\Delta H) i_{dc}$ and the AC output voltage developed across $R_L$ is $v_{ac}$ consequently $$v_{ac} = \frac{(\Delta R/\Delta H)}{1 + (R_0/R_L)} \qquad (4)$$

Thus the efficiency of the voltage transfer for $R_L \gg R_0$ is primarily determined by $(\Delta R/\Delta H)$. The requirements that must be met for a high efficiency magnetoresistive modulator are: a high magnetoresistance coefficient of the magnetoresistor, and a steep, but linear, magnetic field gradient.

The AC signal developed across $R_L$ may be coupled by a capacitor C into the AC amplifier shown in FIG. 9. Alternatively, transformer coupling may be employed instead of capacitor C provided that the applied DC current does not saturate the transformer core.

The magnetoresistor can be driven at frequencies ranging from audio to hypersonic. FIG. 11 illustrates qualitatively the input waveform of a 480 c.p.s. oscillator driving the piezoelectric element (at the top) and the output of a 49.5 ohm (quiescent) magnetoresistor in series with a 2000 ohm load resistor (bottom). The applied DC current was 1 ma. The dependence of the AC output voltage on $R_L$ is shown in FIG. 12 and shows that for $R_L \geqq 80R_0$, the AC output voltage is not dependent on $R_L$ in accordance with Equation 4.

A synchronous magnetoresistive modulator 40 such as in FIG. 8, is shown for a DC amplifier 50 in FIG. 13. The amplifier may be used in conjunction with a diode demodulator bridge circuit, for example, as shown. Diodes $D_1$ and $D_2$ are maintained in a blocked condition by the 1.5 v. DC bias. The output of audio oscillator 36 which also drives piezoelectric transducer 30 is applied to the input of the bridge through a differentiator and clipper formed by diodes $D_3$ and $D_4$, and capacitor $C_1$.

Diodes $D_1$ and $D_2$ are unblocked in synchronism with the motion of the magnetoresistor 34 by the differentiated and clipped pulses applied to the bridge circuit. During this period they can conduct current in the forward direction and can deliver to the output, after suitable filtering, a rectified signal which is proportional to the AC output derived from the tuned audio amplifier 50. The main advantage of synchronous modulation is the very great gain in signal to noise and hence the potential use of such an amplifier for amplification of low-level DC signals.

One of the advantages shared by the electromechanical modulator and the magnetoresistive modulator of this invention is the complete electrical isolation between the DC input and the AC carrier. However, unlike the mechanical modulator, the magnetoresistive modulator does not require any direct switching contact between electrodes, consequently, the maximum operating frequency is not delimited by contact bounce and the useful life cycle is not reduced by contact pitting or fatigue. The lifetime of a magnetoresistive modulator is virtually unlimited and its resonant frequency may be chosen to have any value from a few c.p.s. to several kcs. In addition, the driving power required for the piezoelectric transducer is only about 0.1 times that required for electromechanical devices.

The magnetoresistor element, unlike diode and transistor modulators; has no barrier junctions and consequently is not subject to voltage transient damage or spurious response when the barriers are blocked. Semiconductor modulators operate over a nonlinear portion of their characteristic $i-v$ curve and consequently the DC signal is converted into a Fourier spectrum, rather than the sine-wave characteristics of the magnetoresistive modulator.

A significant advantage of magnetoresistive modulators of this invention is the narrow band, essentially single frequency conversion from DC to AC which they provide and which allows the use of very narrow bandwidth AC follow-up amplifiers. A further advantage is that if the piezoelectric transducer is driven at its resonant frequency, the electrical input can be in the form of a pulse or a relaxation process and yet the displacement of the transducer terminal on which the magnetoresistor is mounted, will still be a sinusoid. A simple circuit for driving the piezoelectric transducer is shown in FIG. 14. In that circuit R and C are chosen so that the repetition rate of the relaxation oscillator is equal to the resonant frequency of the bimorph pezoelectric transducer X. A four-layer silicon diode D is shown as the active nonlinear element although a silicon controlled switch and a unijunction diode can be used to advantage for the same purpose.

Alternative methods of building a magnetoresistive modulator are as follows: A fixed magnetoresistor mounted between the pole pieces of an electromagnet driven at a desired frequency, for example, at 400 c.p.s. Here the quiescent operating point $R_0$ must be biased into the linear $\Delta R/R_0$ vs. $H$ region. The device is bulky and care must be exercised to prevent saturating the electromagnet core. Electromagnetic drive for the magnetoresistor: A loud speaker cone is modified for this purpose. The magnetoresistor is attached to the cone and traverses a linear gradient of a permanent magnet. The voice coil is driven at the resonant frequency of the loudspeaker cone. A high DC to AC efficiency is realized in this device because of the large $\Delta R/\Delta H$ in consequence of the large mechanical displacement of the cone; however, a larger AC carrier power is required than that of the piezoelectric element. Magnetostrictive drive: The magnetoresistor element can be mounted on a reed of magnetic material which is excited by magnetostriction.

What is claimed is:

1. A synchronous magnetoresistive modulator for converting a DC signal into an essentially pure since wave whose peak-to-peak amplitude is a linear function of the DC input, comprising:
 (a) magnetic means for producing a fixed magnetic field gradient,
 (b) a magnetoresistor mounted in the magnetic field of said magnetic means,
 (c) driving means for producing mechanical displacement of said magnetoresistor in the fixed magnetic field gradient of said magnetic means at a desired frequency,
 (d) a load resistance connected in series with said magnetoresistor,
 (e) a signal input applied across both said magnetoresistor and load resistance in series, and the output taken from across said load resistance.

2. A device as in claim 1 wherein said means for producing mechanical displacement of said magnetoresistor causes displacement thereof at any frequency ranging from audio to hypersonic.

3. A device as in claim 1 wherein said magnetic means for producing a fixed magnetic field gradient comprises a permanent magnet.

4. A device as in claim 3 wherein said permanent magnet has pole-pieces positioned on each side of said magnetoresistor and shaped to permit oscillation of the magnetoresistor in a linear magnetic field gradient.

5. A device as in claim 1 wherein the configuration of said magnetoresistor is determined by the need to maximize the change in resistance exhibited by the magnetoresistor in the magnetic field gradient, and the need to keep the change in said resistance an essentially linear function of the mechanical displacement for a sinusoidal monochromatic output signal.

6. A device as in claim 1 wherein said driving means is a piezoelectric transducer driven by an elecrtic field applied thereto from an oscillator circuit, and said magnetoresistor is mounted on one end thereof.

7. A device as in claim 6 wherein said piezoelectric transducer has the other end thereof fixedly mounted and is constrained to move in one direction only in consonance with the electric field from said oscillator circuit.

8. A device as in claim 6 wherein said transducer consists of bilaminar strips fused to an intermediate metallic vane with polarization perpendcular to the length of the lamina and wherein one bilaminar strip expands in consequence of the applied electric field the other contracts thus enhancing the total one-dimensional flexure of the transducer.

9. A device as in claim 1 wherein said magnetic means for producing a fixed magnetic field gradient is an electromagnetic.

10. A device as in claim 1 wherein said means for displacing said magnetoresistor is an electromagnetic drive means.

References Cited
UNITED STATES PATENTS

| | | | |
|---|---|---|---|
| 2,167,254 | 7/1939 | Skellett | 321—44 XR |
| 2,982,906 | 5/1961 | Green | 321—24 XR |
| 3,050,643 | 8/1962 | Connell et al. | 307—277 XR |
| 3,110,824 | 11/1963 | Flanagan | 310—8.5 |
| 3,264,416 | 8/1966 | Jordan et al. | 307—309 XR |
| 3,290,595 | 12/1966 | Novotny. | |
| 3,360,770 | 12/1967 | Friedman et al. | 310—8.5 XR |

JOHN F. COUCH, *Primary Examiner.*

W. M. SHOOP, JR., *Assistant Examiner.*

U.S. Cl. X.R.

307—309; 310—8.5; 330—10, 60; 332—51; 338—32